US006621405B1

(12) United States Patent
Basche et al.

(10) Patent No.: US 6,621,405 B1
(45) Date of Patent: Sep. 16, 2003

(54) CUSTOMIZABLE COMBINATION LOCKING SYSTEM USING TEXTUAL COMBINATIONS

(75) Inventors: Todd Basche, 1060 Estrellita Way, Los Altos, CA (US) 94022; Mark E. Pennell, Austin, TX (US)

(73) Assignee: Todd Basche, Los Altos, CA (US)

( * ) Notice: Subject to any disclaimer, the term of this patent is extended or adjusted under 35 U.S.C. 154(b) by 0 days.

(21) Appl. No.: 09/414,083

(22) Filed: Oct. 6, 1999

(51) Int. Cl.[7] ................................................ G05B 19/00

(52) U.S. Cl. ............................ 340/5.22; 340/542; 70/3; 70/22; 70/26

(58) Field of Search ................................ 340/5.22, 542, 340/5.21, 5.23, 5.25, 5.26, 5.73; 70/3, 20, 21, 22, 26, 24, 25–30, 88

(56) References Cited

U.S. PATENT DOCUMENTS

| | | | | |
|---|---|---|---|---|
| 2,261 | A | | 9/1841 | Gray |
| 73,136 | A | | 1/1868 | Thatcher |
| 338,234 | A | | 3/1886 | Lynch et al. |
| 367,048 | A | | 7/1887 | Kauffeld |
| 502,308 | A | | 8/1893 | Lowrie |
| 534,262 | A | | 2/1895 | Haberer |
| 785,834 | A | | 3/1905 | Quaintance |
| 1,971,914 | A | | 8/1934 | Meadowcroft, Sr. |
| 2,598,457 | A | | 5/1952 | Capdevila |
| 4,354,365 | A | | 10/1982 | Mayer et al. |
| 4,441,346 | A | | 4/1984 | Castiglioni |
| 4,445,348 | A | | 5/1984 | Saitoh |
| 4,534,195 | A | | 8/1985 | Ehrat |
| 4,615,191 | A | | 10/1986 | Grandy |
| 4,621,589 | A | | 11/1986 | Thinnes |
| 4,831,860 | A | | 5/1989 | Sheiman et al. |
| 5,109,684 | A | | 5/1992 | Grandy, Sr. |
| 5,119,650 | A | | 6/1992 | Lo |
| 5,522,243 | A | | 6/1996 | Kusmiss |
| 6,021,653 | A | * | 2/2000 | Pimpo ........................... 70/26 |
| 6,125,568 | A | * | 10/2000 | Granaroli ................... 42/70.11 |

* cited by examiner

*Primary Examiner*—Nina Tong
(74) *Attorney, Agent, or Firm*—Blakely Sokoloff Taylor & Zafman LLP

(57) ABSTRACT

A customizable combination locking system using textual combinations. The principle object of the present invention is to provide a method to create a lock that is capable of being set in any desired set of letters that spells words that are easy for the user to remember. These words are supplied as a list and the tumbler positions are created from that list. The resultant lock would be commercially viable, as it will use existing, standard lock mechanisms comprised of tumbler rings with ten positions (0–9) and two, three, or four tumblers. The letters that appear in each of the ten positions have been selected through the described process. Having been selected, each lock is capable of being set to one of several thousand actual word combinations.

25 Claims, 5 Drawing Sheets

200

| | Tumbler 1 | Tumbler 2 | Tumbler 3 | Tumbler 4 |
|---|---|---|---|---|
| Position 1 | W | O | R | D |
| Position 2 | S | A | M | E |
| Position 3 | F | I | L | M |
| Position 4 | C | E | N | T |
| Position 5 | B | U | A | P |
| Position 6 | L | T | E | N |
| Position 7 | D | L | S | K |
| Position 8 | H | R | O | L |
| Position 9 | P | H | I | H |
| Position 10 | G | N | C | G |

With two letters per position the locks could spell OVER 6000 four letter words:

| | Tumbler 1 | Tumbler 2 | Tumbler 3 | Tumbler 4 |
|---|---|---|---|---|
| Position 1 | BA | LL | WA | SH |
| Position 2 | WA | ND | WI | CK |
| Position 3 | FI | IL | FA | LL |
| Position 4 | DI | NK | PU | NK |
| Position 5 | MA | SH | MA | IL |
| Position 6 | CA | KE | HA | TE |
| Position 7 | CO | CK | DO | ST |
| Position 8 | LA | ST | DI | NG |
| Position 9 | BU | NE | LU | LT |
| Position 10 | WI | LT | FI | NT |

Fig. 2

| | Tumbler 1 | Tumbler 2 | Tumbler 3 | Tumbler 4 |
|---|---|---|---|---|
| Position 1 | W | O | R | D |
| Position 2 | S | A | M | E |
| Position 3 | F | I | L | M |
| Position 4 | C | E | N | T |
| Position 5 | B | U | A | P |
| Position 6 | L | T | E | N |
| Position 7 | D | L | S | K |
| Position 8 | H | R | O | L |
| Position 9 | P | H | I | H |
| Position 10 | G | N | C | G |

Fig. 3

With two letters per position the locks could spell OVER 6000 four letter words:

| | Tumbler 1 | Tumbler 2 | Tumbler 3 | Tumbler 4 |
|---|---|---|---|---|
| Position 1 | BA | LL | WA | SH |
| Position 2 | WA | ND | WI | CK |
| Position 3 | FI | IL | FA | LL |
| Position 4 | DI | NK | PU | NK |
| Position 5 | MA | SH | MA | IL |
| Position 6 | CA | KE | HA | TE |
| Position 7 | CO | CK | DO | ST |
| Position 8 | LA | ST | DI | NG |
| Position 9 | BU | NE | LU | LT |
| Position 10 | WI | LT | FI | NT |

CUSTOMIZABLE COMBINATION LOCKING SYSTEM USING TEXTUAL COMBINATIONS

FIELD OF THE INVENTION

The present invention relates to all combination locks in which the combination can be freely set or changed to any other combination by the user.

BACKGROUND OF THE INVENTION

Problem with Existing Numeric Combination Locks

Combination locks have existed for many years. The most common combination lock uses a fixed set of numbers that the user may choose from to select the desired combination. All existing commercially viable combination locks have used 10 tumbler positions and two, three, or four sets of these tumblers to make up the lock. The more tumbler positions there are, the larger the number of possible numeric combinations to choose from. However, all these numeric locks have the same problem. The user must remember a numeric code made up of two (00–99), three (000–999), or four (0000–9999) digits. These numbers have no meaning and are often difficult for the user to remember. Children and the elderly often forget the number they entered and stop using the lock.

Many people are dyslexic or have memory and cognitive limitations, and remembering 4 numerical digits would be very difficult. Recognizing that numbers are difficult to remember, U.S. Pat. No. 5,522,243 created a lock for which colors and symbols might be used for combinations in place of numbers.

Words are more Natural for People

For most people, especially children and the elderly, words are much easier to remember than numbers. Words are the natural way in which humans communicate with each other. However, creating a lock comprised of words has required lock mechanisms to have 26 tumbler positions (A–Z) (See U.S. Pat. No. 4,621,589). This would require a much more expensive lock hardware mechanism with 26 rather than 10 tumbler positions. Additionally these patents describe locks with one letter per tumbler position and would require many more sets of tumblers to contain enough letters to spell out words. The combination locks commercially available today all use ten tumbler positions (0–9) and no more than 4 tumblers (0000–9999) and has precluded the production of commercially viable locks using letters, to spell words.

No Ability to Customize

With existing lock mechanisms the user purchases the lock with the set of tumblers and numbers as supplied by the lock manufacturer. While the user can set or change the combination (U.S. Pat. No. 4,445,348, and others), they can only set or change it using the numbers supplied by the lock manufacturer. The numbers are fixed on a set of rings (denoted tumbler rings herein) which, in some locks can be adjusted to set a desired unlocking combination. A combination lock, once purchased is only able to be set to the digits between 0000 and 9999, in the case of a four-tumbler combination lock. Furthermore, there is no method of differentiating one combination lock from another, as they all contain the same 0000 to 9999.

DESCRIPTION OF THE RELATED ART

Many combination locks have been patented that allow the user to set and change the combination of numbers (see U.S. Pat. Nos. 4,445,348 and 5,109,684 and 4,615,191 etc.). These all describe combination locks with numbers. There have also been locks that allow the user to create words (see U.S. Pat. No. 4,621,589). These all describe combination locks that require 26 tumbler positions to create meaningful words. They also describe locks that would use one letter per tumbler position and would require many more than 4 tumblers to create meaningful words.

One lock describes the use of colors in an attempt to create a lock with combination that are easier to remember than numbers (U.S. Pat. No. 5,522,243)

SUMMARY OF THE INVENTION

The present invention is a customizable combination locking system using textual combinations. The principle object of the present invention is to provide a method to create a lock that is capable of being set in any desired set of letters that spells words that are easy for the user to remember. These words are supplied as a list and the tumbler positions are created from that list. The resultant lock would be commercially viable, as it will use existing standard lock mechanisms comprised of tumblers with ten positions (0–9) and two, three, or four tumblers.

The letters that appear in each of the ten positions have been selected through the described process. Having been selected, each lock is capable of being set to one of several thousand actual word combinations.

BRIEF DESCRIPTION OF THE DRAWINGS

The present invention is illustrated by way of example and not limitation in the figures of the accompanying drawings, in which

FIG. 2 is an example of a table illustrating ten positions of the four tumbler rings with one letter per position.

FIG. 3 is an example of a table illustrating ten positions of the four tumbler rings with two letters per position.

DETAILED DESCRIPTION OF THE PREFERRED EMBODIMENT

Figure 1:
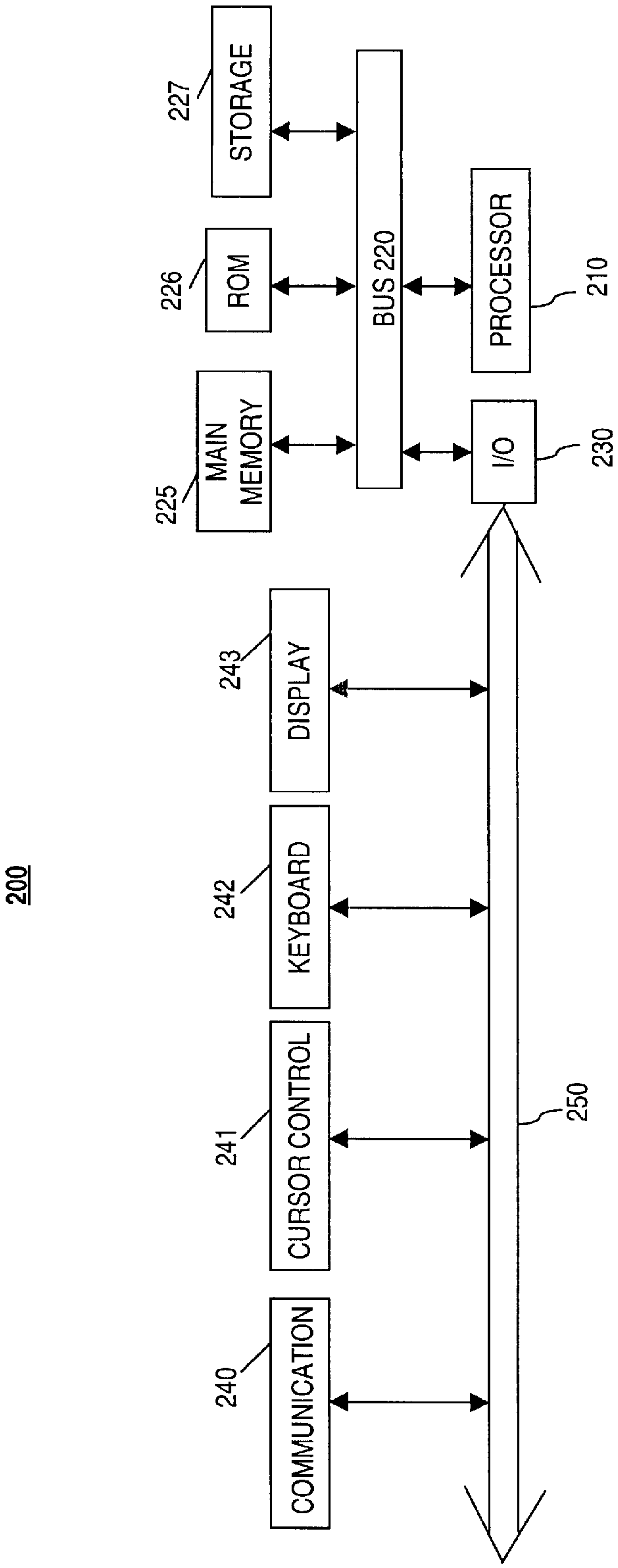
FIG. 1 illustrates the prior art architecture of a conventional computer system used in the preferred embodiment to perform the process of the present invention.

The present invention is a customizable combination locking system using textual combinations. In the following detailed description, numerous specific details are set forth in order to provide a thorough understanding of the present invention. However, it will be apparent to one of ordinary skill in the art that these specific details need not be used to practice the present invention. In other circumstances, well-known structures, materials, circuits, processes and interfaces have not been shown or described in detail in order not to unnecessarily obscure the present invention.

The Process of the Preferred Embodiment

By using the inventive process described herein, we can create a lock that uses tumbler rings having the standard ten position lock mechanisms, yet uses letters to spell out words. It will be apparent to those of ordinary skill in the art that the present invention works just as well with tumblers having a different number of positions.

The resultant locks can be used to produce, for example:

Bike locks

Locker locks

Briefcases with these locks built in

Lunch boxes with these locks built in

Backpack locks

A lock manufacturer, a third party, any individual, or any electronic means creates a list of desired words. This list of words can be, for example:

Random words

Sports teams names (basketball, baseball, football, etc)

Movie characters (star wars, etc.)

Beanie baby names

Pokemon characters

Themes (computer words, fishing words, poetry, art terms, animals, psychology terms etc)

Different languages (Spanish, German, French, etc.)

The list of words is processed by the described method, and it creates the tumbler positions for the lock such that the lock now has the desired letters to be able to spell out the words contained in the supplied list. The resultant lock can then be set by the user into any of the hundreds or thousands of words contained in that specific list.

The method is also flexible enough to be able to produce tumbler rings with any quantity of letters in each position. For example, a lock with four tumblers, with one letter per tumbler ring could spell: C A T S(CATS), using one letter per position. If there are two letters per position the same lock could spell: CA TS RU LE (CATS RULE), still using only four tumblers. With three letters per position, the.same lock could spell out: CAT SAR EGR EAT (CATS ARE GREAT), and still only use four tumblers.

Additionally, the method can produce entries for four tumbler locks comprised of one four letter word, one six letter word, two four letter words, or one eight letter word.

An example with one letter per position and four tumbler rings (as shown in FIG. 2), the lock can spell over 700 four-letter words:

WORD

SAME

FILM

CENT

FACE

LOCK

Etc.

The present invention also includes a method by which locks can be fully customized by the users. There are currently tens of millions of combination locks that are produced with plastic tumbler rings with the number positions engraved on them (e.g. See U.S. Pat. No. 4,445,348 or U.S. Pat. No. 5,109,684). These tumbler rings are removable as a way for the user to set and change the numerical combination. We describe a method whereby the tumbler rings can be produced with the different letters on them, thereby forming words in the various themes as described above. These tumbler rings can be sold to the owners of the existing locks to enable them to customize the existing locks from a numerical lock into a word lock with the theme of their choice.

Furthermore, the users could supply a list of their own words (random words, names of children on a sports team, names of children at a birthday party, etc) to a company, or web site. The company could then, using the described method, produce the resultant plastic tumbler rings that would create a lock that spelled the words supplied by the end user. This would allow for a fully customized/personalized lock for that specific user.

Description of the Method to Create the Tumbler Positions from the Supplied List or Lists The goal of this process is to generate four tumbler rings, each containing ten positions, with each position containing a quantity of letters (1–N). The tumbler rings are optimized in such a way as to be able to spell the largest number of possible words from a supplied word list. This process can be used to produce tumbler rings that spell out:

A) 1 Four letter word (1 letter per position)

B) 2 Four letter words (2 letters per position), as shown in FIG. 3.

C) 3 Four letter words (3 letters per position)

D) 1 Six letter word (2 letters per position)

E) 2 Six letter words (3 letters per position)

F) 1 Eight letter word (2 letters per position)

(G) 1 Twelve letter word (3 letters per position)

H) etc.

Figure 4A:
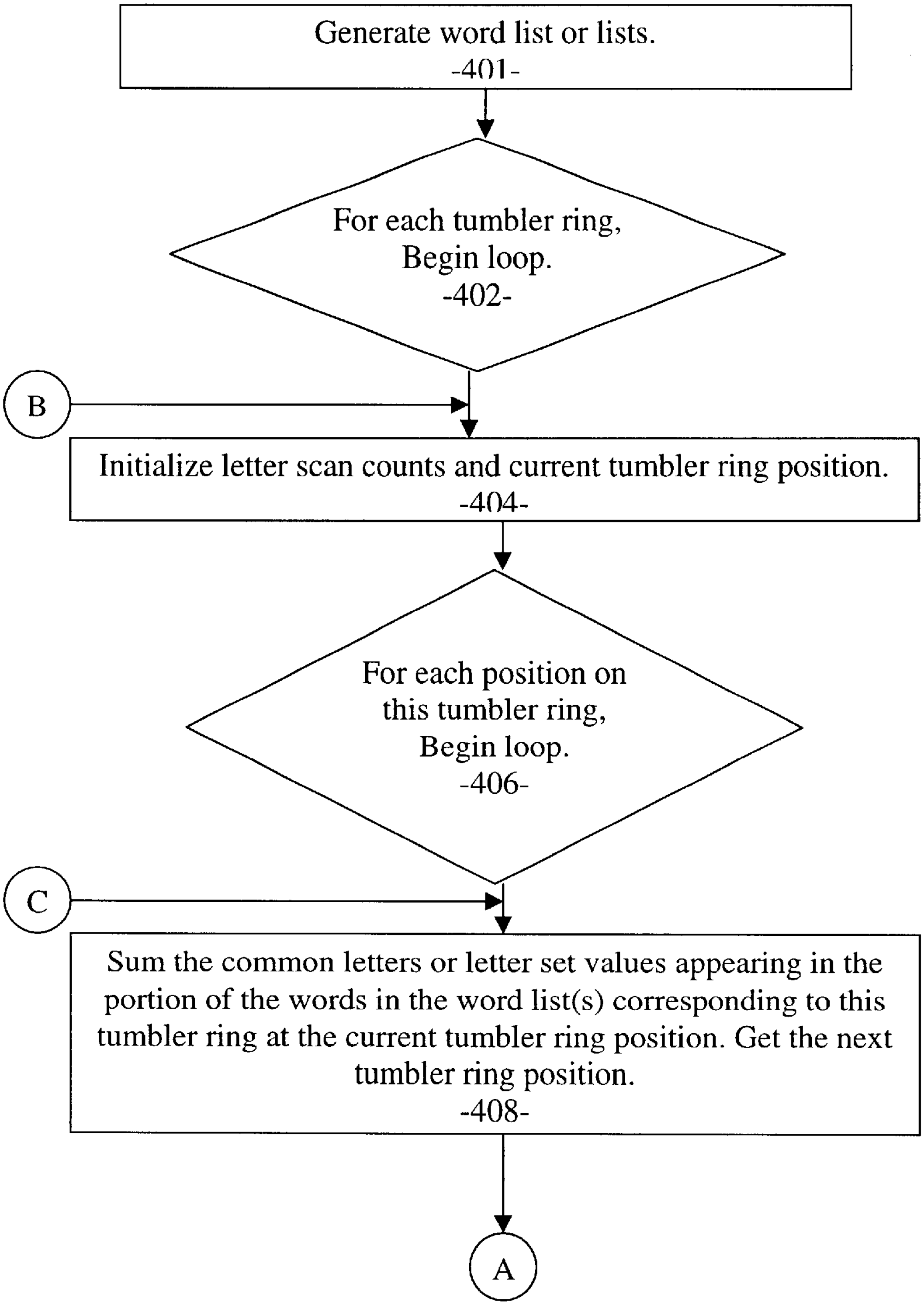
FIGS. 4A and 4B are flowcharts illustrating the processing flow used in the preferred embodiment.
Figure 4B:
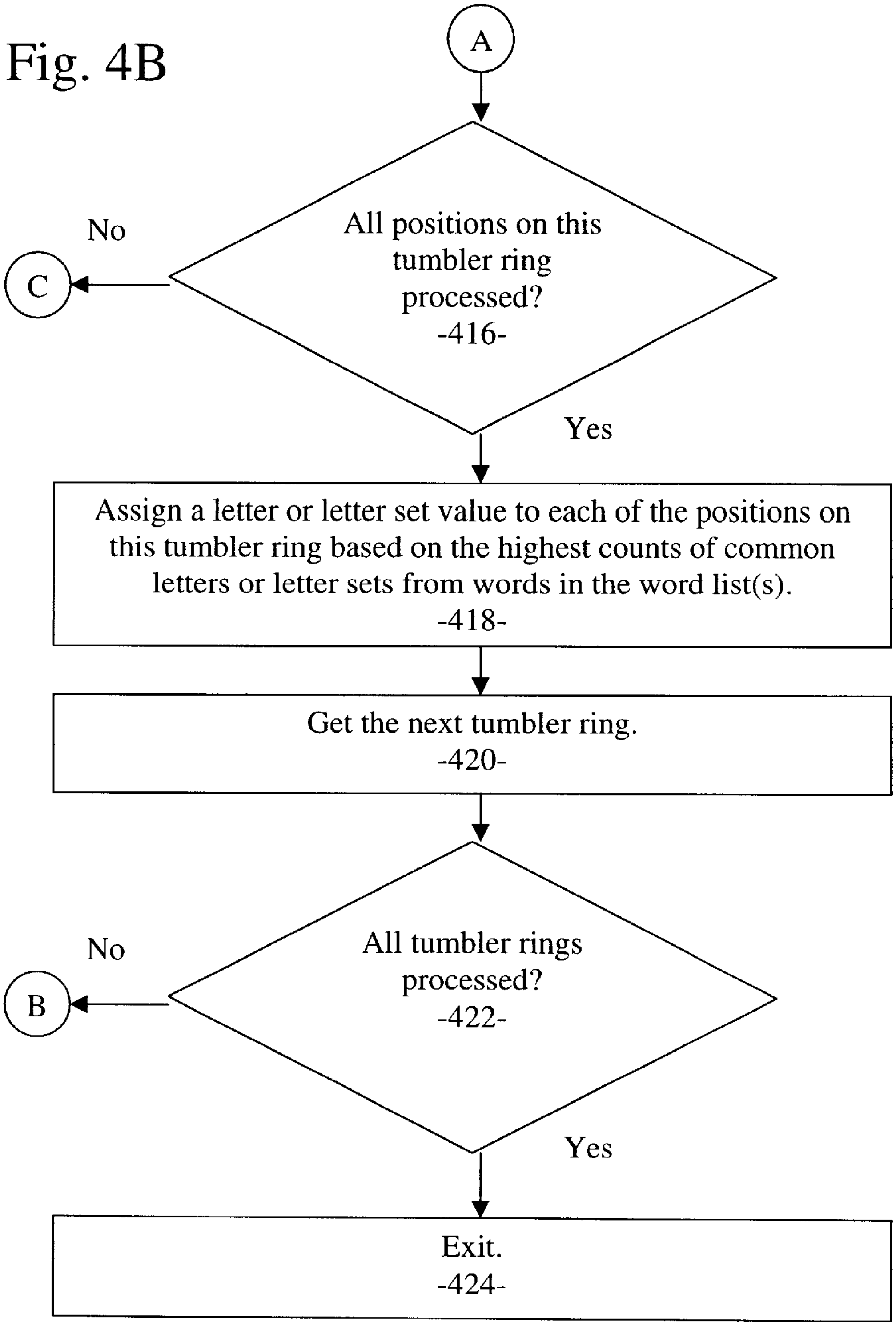

When the supplied list is a list of four (4) letter words, and the desired outcome is for one letter per position the process is as follows. The corresponding processing flow is also shown in FIGS. 4A and 4B.

Step 1. Generation of the Word List

A file is generated by some means, which contains a list of words, which are exactly four letters in length. This list is created by the user or by the manufacturer. For the desired theme (sports, movies, beanie babies, etc.), see above.

Step 2. Generation of Tumbler 1

The first tumbler will be used to spell the first letter of the word. The process to create the tumbler is as follows:

Step 2a. Generation of a Position

A position entry consists of one letter ranging from A to Z, which allows for a total of 26 position entries.

Step 2b. Frequency Counts Established

For each position entry, the entire word list is scanned to determine how many individual words start with the letter represented by the current position entry.

Step 2c. Highest 10 Frequencies Collected

A set of 10 position entries comprising the 10 highest frequency counts in descending order are selected for the positions 1 through 10 of this tumbler, respectively.

Step 3. Generation of Tumbler 2

The second tumbler will be used to spell the second letter of the word. The process to create the tumbler is as follows:

Step 3a. Generation of a Position

A position entry consists of one letter ranging from A to Z, which allows for a total of 26 position entries.

Step 3b. Frequency Counts Established

For each position entry, the entire word list is scanned to determine how many individual words have their second letter represented by the current position entry.

Step 3c. Highest 10 Frequencies Collected

A set of 10 position entries comprising the 10 highest frequency counts in descending order are selected for the positions 1 through 10 of this tumbler, respectively.

Step 4. Generation of Tumbler 3

The third tumbler will be used to spell the third letter of the word. The process to create the tumbler is as follows:

Step 4a. Generation of a Position

A position entry consists of one letter ranging from A to Z, which allows for a total of 26 position entries.

Step 4b. Frequency Counts Established

For each position entry, the entire word list is scanned to determine how many individual words have their third letter represented by the current position entry.

Step 4c. Highest 10 Frequencies Collected

A set of 10 position entries comprising the 10 highest frequency counts in descending order are selected for the positions 1 through 10 of this tumbler, respectively.

Step 5. Generation of Tumbler 4

The fourth tumbler will be used to spell the fourth letter of the word. The process to create the tumbler is as follows:

Step 5a. Generation of a Position

A position entry consists of one letter ranging from A to Z, which allows for a total of 26 position entries.

Step 5b. Frequency Counts Established

For each position entry, the entire word list is scanned to determine how many individual words have their fourth letter represented by the current position entry.

Step 5c. Highest 10 frequencies Collected

A set of 10 position entries comprising the 10 highest frequency counts in descending order are selected for the positions 1 through 10 of this tumbler, respectively.

For the case where the desired outcome is to produce tumbler rings with two letters per position the process is as follows:

I) The goal of this process is to generate 4 tumbler rings, each containing 10 positions, with each position containing a number of letters (1–N), in this example 2. The tumbler rings are optimized in such a way as to be able to spell the largest number of possible words or phrases from a supplied list of words or phrases.

Step 1. Generation of the Word List

A file is generated by some means, which contains a list of words, which are exactly 8 letters in length. This list is created by the lock manufacturer, a third party, any individual, or any electronic means. For the desired theme (sports, movies, beanie babies, etc, see above)

Step 2. Generation of Tumbler 1

The first tumbler will be used to spell the first two letters of the word or phrases. The process to create the tumbler is as follows:

Step 2a. Generation of a Tumbler Entries

A tumbler entry consists of a two-letter combination ranging from AA to ZZ, which allows for a total of 676 tumbler entries. All possible 676 tumbler entries are generated.

Step 2b. Frequency Counts Established

For each tumbler entry, the entire phrase list is scanned to determine how many individual words or phrases start with the two letters represented by the current tumbler entry.

Step 2c. Highest 10 Frequencies Collected

A set of 10 tumbler entries comprising the 10 highest frequency counts in descending order are selected for the positions 1 through 10 of this tumbler, respectively.

Step 3. Generation of the $2^{nd}$ Tumbler

The second tumbler will be used to spell the third and fourth letters of the word or phrase. The process to create the tumbler is as follows:

Step 3a. Generation of a Tumbler Entries

A tumbler entry consists of a two-letter combination ranging from AA to ZZ, which allows for a total of 676 tumbler entries. All possible 676 tumbler entries are generated.

Step 3b. Frequency Counts Established

For each tumbler entry, the entire phrase list is scanned to determine how many individual phrases have third and fourth letters that match the two letters represented by the current tumbler entry.

Step 3c. Highest 10 Frequencies Collected

A set of 10 tumbler entries comprising the 10 highest frequency counts in descending order are selected for the positions 1 through 10 of this tumbler, respectively.

Step 4. Generation of the $3^{rd}$ tumbler

The third tumbler will be used to spell the fifth and sixth letters of the phrases. The process to create the tumbler is as follows:

Step 4a. Generation of a Tumbler Entries

A tumbler entry consists of a two-letter combination ranging from AA to ZZ, which allows for a total of 676 tumbler entries. All possible 676 tumbler entries are generated.

Step 4b. Frequency Counts Established

For each tumbler entry, the entire phrase list is scanned to determine how many individual phrases have fifth and sixth letters that match the two letters represented by the current tumbler entry.

Step 4c. Highest 10 Frequencies Collected

A set of 10 tumbler entries comprising the 10 highest frequency counts in descending order are selected for the positions 1 through 10 of this tumbler, respectively.

Step 5. Generation of the $4^{th}$ Tumbler

The fourth tumbler will be used to spell the seventh and eighth letters of the phrases. The process to create the tumbler is as follows:

Step 5a. Generation of a Tumbler Entries

A tumbler entry consists of a two-letter combination ranging from AA to ZZ, which allows for a total of 676 tumbler entries. All possible 676 tumbler entries are generated.

Step 5b. Frequency Counts Established

For each tumbler entry, the entire phrase list is scanned to determine how many individual phrases have seventh and eighth letters that match the two letters represented by the current tumbler entry.

Step 5c. Highest 10 Frequencies Collected

A set of 10 tumbler entries comprising the 10 highest frequency counts in descending order are selected for the positions 1 through 10 of this tumbler, respectively.

Referring now to FIG. 1, a diagram illustrates an example of a computer system 200 illustrating an exemplary client or server computer system in which the features of the present invention may be implemented. Computer system 200 is comprised of a bus or other communications means 220 for communicating information, and a processing means such as processor 210 coupled with bus 220 for processing information. Computer system 200 further comprises a random access memory (RAM) or other dynamic storage device 225 (commonly referred to as main memory), coupled to bus 220 for storing information and instructions to be executed by processor 210. Main memory 225 also may be used for storing temporary variables or other intermediate information during execution of instructions by processor 210. Computer system 200 also comprises a read only memory (ROM) and/or other static storage device 226 coupled to bus 220 for storing static information and instructions for processor 210.

An optional data storage device 227 such as a magnetic disk or optical disk and its corresponding drive may also be coupled to computer system 200 for storing information and instructions. Computer system 200 can also be coupled via bus 250 to a display device 243, such as a cathode ray tube (CRT) or a liquid crystal display (LCD), for displaying information to a computer user. For example, textual or graphical depictions of lock tumblers or locking combinations and/or other types of graphical or textual information may be presented to the user on display device 243. Typically, an alphanumeric input device 242, including alphanumeric and other keys is coupled to bus 250 for communicating information and/or command selections to processor 210. Another type of user input device is cursor control device 241, such as a conventional mouse, trackball, or other type of cursor direction keys for communicating direction information and command selection to processor 210 and for controlling cursor movement on display 243.

A communication device 240 is also typically coupled to bus 250 for accessing remote computers or servers, such as a World Wide Web (WWW) server, or other servers via the Internet, for example. The communication device 240 may include a modem, a network interface card, or other well known interface devices, such as those used for interfacing with Ethernet, Token-ring, or other types of networks. In any event, in this manner, the computer system 200 may be coupled to a server via a conventional network infrastructure such as the Internet.

The system of the present invention may include software, information processing hardware, and various processing steps, described above. The features and process steps of the present invention may be embodied in machine or computer executable instructions. The instructions can be used to cause a general purpose or special purpose processor, which is programmed with the instructions to perform the steps of the present invention. Alternatively, the features or steps of the present invention may be performed by specific hardware components that contain hard-wired logic for performing the steps, or by any combination of programmed computer components and custom hardware components. While embodiments of the present invention are described with reference to the exemplary conventional computer system described herein, the inventive method and apparatus described herein is equally applicable to other data processing or communications systems. Further, the present invention may be implemented manually without the aid of a computer or processor.

Thus, a customizable combination locking system using textual combinations is disclosed. Although the present invention is described herein with reference to a specific preferred embodiment, many modifications and variations therein will readily occur to those with ordinary skill in the art. Accordingly, all such variations and modifications are included within the intended scope of the present invention as defined by the following claims.

We claim:

1. A customizable combination locking method using textual combinations, said method comprising:

a. defining a set of words in a first word list;

b. determining the quantity of words from the first word list having common letters at each of a plurality of tumbler positions;

c. assigning at least one letter to each of the plurality of tumbler positions on a tumbler ring based on the quantity of words from the first word list having corresponding common letters;

d. repeating steps b and c for each of a plurality of tumblers, thereby producing a plurality of tumbler rings each having the plurality of assigned letters at each of the plurality of tumbler positions, said plurality of tumbler rings when appropriately aligned spelling out at least one word from the first word list, said at least one word representing an unlocking combination.

2. The method as claimed in claim 1 wherein each tumbler ring position is assigned a plurality of letters.

3. The method as claimed in claim 1 wherein each tumbler ring position is assigned a word from the first word list.

4. The method as claimed in claim 1 wherein each tumbler ring is replaceable.

5. The method as claimed in claim 1 wherein each word in the first word list is related to a common theme.

6. The method as claimed in claim 1 wherein each word in the first word list is obtained via the Internet.

7. The method as claimed in claim 1 further including:

e. defining a set of words in a second word list, said first word list being used to assign at least one letter to a first set of at least one tumbler ring, the second word list being used to assign at least one letter to a second set of at least one tumbler ring.

8. A customizable combination locking method using textual combinations, said method comprising:

a. defining a set of words in a first word list;

b. defining a set of words in a second word list, said first word list being used to assign at least one letter to a first set of at least one tumbler ring, the second word list being used to assign at least one letter to a second set of at least one tumbler ring;

c. determining a first quantity of words from the first word list having common letters at each of a plurality of tumbler positions for the first set of at least one tumbler ring;

d. determining a second quantity of words from the second word list having common letters at each of a plurality of tumbler positions for the second set of at least one tumbler ring;

e. assigning at least one letter to each of the plurality of tumbler positions on the first set of at least one tumbler ring based on the first quantity of words;

f. assigning at least one letter to each of the plurality of tumbler positions on the second set of at least one tumbler ring based on the second quantity of words;

g. repeating steps c, d, e, and f for each of a plurality of tumblers, thereby producing a plurality of tumbler rings each having the plurality of assigned letters at each of the plurality of tumbler positions, said plurality of tumbler rings when appropriately aligned spelling out at least one word from the first and second word lists, said at least one word representing an unlocking combination.

9. The method as claimed in claim 8 wherein each tumbler ring position is assigned a plurality of letters.

10. The method as claimed in claim 8 wherein each tumbler ring is replaceable.

11. The method as claimed in claim 8 wherein each word in the first word list is related to a first common theme and each word in the second word list is related to a second common theme.

12. The method as claimed in claim 8 wherein each word in the first and the second word list is obtained via the Internet.

13. A customizable combination locking system using textual combinations, said system having program logic for execution in a computer system, said program logic comprising:

a. program logic configured to define a set of words in a first word list from which at least one unlocking combination is created;

b. program logic configured to determine the quantity of words from the first word list having common letters at each of a plurality of tumbler positions;

c. program logic configured to assign at least one letter to each of the plurality of tumbler positions on a tumbler ring based on the quantity of words from the first word list having corresponding common letters;

d. program logic configured to repeat program logic b and c for each of a plurality of tumblers, thereby producing a plurality of tumbler rings each having the plurality of assigned letters at each of the plurality of tumbler positions, said plurality of tumbler rings when appropriately aligned spelling out at least one word from the first word list, said at least one word representing an unlocking combination.

14. A machine-readable medium having instructions to cause a machine to perform a method, said method comprising:

a. defining a set of words in a first word list;

b. determining the quantity of words from the first word list having common letters at each of a plurality of tumbler positions;

c. assigning at least one letter to each of the plurality of tumbler positions on a tumbler ring based on the quantity of words from the first word list having corresponding common letters;

d. repeating steps b and c for each of a plurality of tumblers, thereby producing the plurality of tumbler rings each having the plurality of assigned letters at each of the plurality of tumbler positions, said plurality of tumbler rings when appropriately aligned spelling out at least one word from the first word list, said at least one word representing an unlocking combination.

15. The machine-readable medium of claim 14, wherein each tumbler ring position is assigned a plurality of letters.

16. The machine-readable medium of claim 14, wherein each tumbler ring position is assigned a word from the first word list.

17. The machine-readable medium of claim 14, wherein each tumbler ring is replaceable.

18. The machine-readable medium of claim 14, wherein each word in the first word list is related to a common theme.

19. The machine-readable medium of claim 14, wherein each word in the first word list is obtained via the Internet.

20. The machine-readable medium of claim 14, further comprising:

e. defining a set of words in a second word list, said first word list being used to assign at least one letter to a first set of at least one tumbler ring, the second word list being used to assign at least one letter to a second set of at least one tumbler ring.

21. A machine-readable medium having instructions to cause a machine to perform a method, the method comprising:

a. defining a set of words in a first word list;

b. defining a set of words in a second word list, said first word list being used to assign at least one letter to a first set of at least one tumbler ring, the second word list being used to assign at least one letter to a second set of at least one tumbler ring;

c. determining a first quantity of words from the first word list having common letters at each of a plurality of tumbler positions for the first set of at least one tumbler ring;

d. determining a second quantity of words from the second word list having common letters at each of a plurality of tumbler positions for a second set of at least one tumbler ring;

e. assigning at least one letter to each of the plurality of tumbler positions on the first set of at least one tumbler ring based on the first quantity of words;

f. assigning at least one letter to each of the plurality of tumbler positions on the second set of at least one tumbler ring based on the second quantity of words;

g. repeating steps c, d, e, and f for each of a plurality of tumblers, thereby producing a plurality of tumbler rings each having the plurality of assigned letters at each of the plurality of tumbler positions, said plurality of tumbler rings when appropriately aligned spelling out at least one word from the first and second word lists, said at least one word representing an unlocking combination.

22. The machine-readable medium of claim 21, wherein each tumbler ring position is assigned a plurality of letters.

23. The machine-readable medium of claim 21, wherein each tumbler ring is replaceable.

24. The machine-readable medium of claim 21, wherein each word in the first word list is related to a first common theme and each word in the second word list is related to a second common theme.

25. The machine-readable medium of claim 21, wherein each word in the first and the second word list is obtained via the Internet.

* * * * *